United States Patent Office 2,979,494
Patented Apr. 11, 1961

2,979,494

METHOD OF PRODUCING ESSENTIALLY CIS RUBBERY POLYISOPRENE

Richard S. Stearns, Akron, Ohio, assignor to The Firestone Tire & Rubber Company, Akron, Ohio, a corporation of Ohio No Drawing. Filed Sept. 1, 1955, Ser. No. 532,095

2 Claims. (Cl. 260—94.2)

In copending U.S. patent application of Wakefield and Foster Serial No. 530,396, filed August 24, 1955, there are described new synthetic polyisoprene rubbers having properties very similar to Hevea rubber. The new synthetic polyisoprenes exhibit an essentially cis-1,4-structure by infra-red technique, have high gum tensiles, low hysteresis and low flex-cracking values when vulcanized, and in elongated condition exhibit X-ray diffraction diagrams typical for a crystalline fiber, the points of maximum intensity of the X-ray diffraction diagrams for a highly elongated synthetic polyisoprene of this type having the same coordinates as the points of maximum intensity of an X-ray diffraction diagram of elongated Hevea rubber. The new synthetic polyisoprene rubbers are produced by polymerizing isoprene in the presence of metallic lithium and in the substantial absence of oxygen, oxygen-containing compounds and unsaturated organic compounds other than isoprene.

In the copending U.S. patent application of Forman, Serial No. 532,097, filed September 1, 1955, there is described a method of producing polymers of the above type having greater molecular weights and less gel than polymers ordinarily obtained by bulk technique. The Forman method involves application of solution polymerization technique to polymerization of isoprene in the presence of lithium and makes use of saturated hydrocarbons as solvents therein.

The present invention also is concerned with producing synthetic essentially cis-1,4-polyisoprenes having low gel contents and molecular weights approximating or exceeding the molecular height of Hevea rubber. Additionally, the present invention has an object of producing polyisoprene rubbers having microstructure and other properties closely approximating or better than the properties of Hevea rubber. The polymers of the present invention also exhibit, in highly elongated condition, X-ray diffraction diagrams typical for a crystalline fiber, the points of maximum intensity thereof having the same coordinates as the points of maximum intensity of an X-ray diffraction diagram of elongated Hevea.

Polymerizations of isoprene in the presence of lithium tend to proceed only after a relatively long induction period, particularly at temperatures of about 30° C. or lower. The polymerization reaction, once started, is quite exothermic and consequently very difficult to control. This is particularly true in the case of mass polymerization (either vapor phase or liquid phase) where the polymerization, once started, often proceeds with explosive violence and a portion of the polymer often burns. If the polymerization proceeds at an excessive temperature, the resulting polymer tends to have a low molecular weight; it contains considerable gel and its microstructure includes considerable trans-1,4-; 1,2-; and 3,4-addition products.

In accordance with the present invention, it has been found that the above difficulties are minimized; and excellent synthetic polyisoprene rubbers are obtained, by either bulk or solution polymerization of isoprene in the presence of metallic lithium as described in the above copending applications, if polymerization is first initiated and the temperature of the reactants is then appreciably reduced and the major proportion of polymerization is effected at reduced temperature. In the case of either bulk or solution, polymerization in accordance with the invention is desirably initiated at from about 30° C. to about 70° C. and thereafter the reaction temperature is reduced to any desired lower temperature below the initiation temperature to as low as about −20° C. for completing the polymerization. The polymer properties are improved as the temperature of polymerization is lowered. Consequently, polymerizations are in accordance with the invention carried out at the lowest practical temperature within the above general range. Polymerizations are initiated at temperatures below 30° C. in accordance with the invention by the observance of certain requirements which are illustrated hereafter. In polymerization according to the invention the temperature should be maintained at the low temperature used for polymerization until such time as any excess lithium catalyst can be expended. This precaution can be accomplished in any suitable manner, one of which involves venting the polymerization zone to air before allowing the temperature of the polymerization zone to rise. It has been found that the properties of the polymer are sometimes adversely affected if this precautionary measure is not observed.

The plurality of different temperatures utilized in practicing the invention are readily achieved by providing a single reaction zone with associated means for changing the temperature thereof. Alternatively, there can be provided a plurality of reaction zones, each one of which is provided with means associated therewith for being maintained at any predetermined temperature, and being further provided with suitable means for transferring contents to successive reaction zones. The process of the invention is readily practiced in either a batch or continuous manner.

General considerations concerning substantial absence of oxygen, oxygen-containing compounds and unsaturated organic compounds other than isoprene from the polymerization zone; monomer purity; type of solvent if used; catalyst preparation; certain details of polymerization; microstructure as indicated by inherent viscosity; and microstructure as determined by infra-red technique (whereby Hevea consists of 97.8% cis-1,4-structure and 2.2% 3,4-structure); and X-ray diffraction technique are discussed in detail in the above mentioned copending applications and are equally applicable here. For these general considerations reference may be had to these copending applications. The meaning and scope of the present invention will become further apparent from the following illustrations and the discussion thereof.

*Example 1*

Three reaction vessels were each loaded with identical isoprene [1] and varying amounts per 100 parts by weight of monomer of finely divided metallic lithium sand (as a 35% dispersion in petroleum jelly) as follows: Samples 1 and 2 each contained 0.2 part by weight of lithium and Sample 3 contained 0.1 part by weight lithium. In loading the reaction vessels, precautions were taken to substantially exclude oxygen and oxygen-containing compounds from the reaction zone. Sample 1 was polymerized in accordance with the invention by first heating at 40° C. until polymerization had commenced and then reducing the temperature by exterior cooling means to 0° C. Samples 2 and 3 were heated at 40° C. until

[1] Supplied by Enjay Company and purified to about 95% mol purity.

polymerization was complete. Sample 2 exploded. Inherent viscosity and gel determinations were made on the polymers from each of the samples including the polymer recoverable from Sample 2. The results of these determinations were as follows:

| Sample No. | Percent Gel | Inherent Viscosity |
| --- | --- | --- |
| 1 | 10.0 | 7.52 |
| 2 | 36.8 | 2.62 |
| 3 | 26.8 | 4.46 |

From the above, it is apparent that Sample 1 in accordance with the invention had substantially less gel and greater molecular weight than the other samples.

*Example 2*

Four reaction vessels were each loaded with an identical isoprene (similar in purity to that used in Example 1) and varying parts by weight of lithium sand per 100 parts monomer as follows: Sample 4 contained 0.1 part lithium; Sample 5 contained 0.05 part lithium; Sample 6 contained 0.035 part lithium; and Sample 7 contained 0.025 part lithium. Sample 6 was polymerized in accordance with the invention by heating at 50° C. until polymerization commenced. Sample 6 was then cooled to, and maintained at, 0° C. until polymerization was complete. Samples 4, 5 and 7 were heated continuously at 50° C. until polymerization was complete. Samples 5 and 7 exploded. Inherent viscosity and gel content were determined on the polymer resulting from each of the samples and were as follows:

| Sample No. | Percent Gel | Inherent Viscosity |
| --- | --- | --- |
| 4 | 37.5 | 3.02 |
| 5 | 40.0 | 4.90 |
| 6 | 6.0 | 7.20 |
| 7 | 34.8 | 2.46 |

Again, it is apparent that polymerization in accordance with the invention (Sample 6) produced a polymer of higher molecular weight and lower gel content than polymerization without benefit of the invention.

*Example 3*

Another reaction vessel was loaded in vacuo with a purer grade of isoprene[2] and 0.1 part by weight of lithium sand per 100 parts monomer. This sample (Sample 8) was polymerized in accordance with the invention by allowing the polymerization to initiate at 0° C. and thereupon reducing and maintaining the temperature at −20° C. until polymerization was complete. The resulting polymer was found to have a gel content of 8.2 percent and inherent viscosity of 12.97. It has been found necessary in carrying out polymerization of this type at temperatures of the low order used in this example to charge the reaction vessel in vacuo in order for polymerization to take place. This practice is apparently made necessary by traces of oxygen or the like which otherwise may be present in the reaction zone. Loading a polymerization vessel in vacuo has generally desirable application in polymerizations in accordance with invention (including polymerizations initiated and run at higher temperatures than the present example), since this technique shortens the induction time and lowers the temperature at which polymerization will proceed.

*Example 4*

Two reaction vessels were charged identically with isoprene[3] and 0.1 part lithium sand per 100 parts mono-

[2] Pure grade supplied by Phillips Petroleum Company and having a purity of 99 mol percent.
[3] Supplied by Phillips Petroleum Company (pure grade).

mer. Polymerization was carried out in one of the reaction vessels (Sample 11) in accordance with the invention by initiating polymerization at 50° C., transferring the contents of the reaction vessel to another reaction container having means associated therewith for maintaining a temperature of 0° C.; polymerization was completed in this container at 0° C. The other reaction vessel (Sample 12) was also heated to 50° C. to initiate polymerization but at this point the reaction became uncontrollable and a portion of the resulting polymer burned to an extremely soft black sticky mass; the remaining portion of the polymer did not appear burned. Microstructure determinations were made by infra-red technique as follows: on the polymer of Sample 11, on the apparently unburned portion of Sample 12 (referred to hereafter as Sample 12A) and on the burned portion of Sample 12 (hereafter referred to as Sample 12B). Inherent viscosity and percent gel were determined on Samples 11 and 12A. The results of these determinations were as follows:

|  | Sample 11 | Sample 12A | Sample 12B |
| --- | --- | --- | --- |
| Gel, percent | 5.50 | 1.00 |  |
| Inherent viscosity | 7.87 | 3.84 |  |
| Cis-1,4, percent | 93.40 | 89.50 | 74.4 |
| Trans-1,4, percent | 0.00 | 1.40 | 13.2 |
| 1,2, percent | 0.08 | 0.00 | 0.0 |
| 3,4, percent | 6.50 | 9.10 | 12.0 |

Here, it is seen that control of the reaction by the method of the invention is effective in producing polymers from isoprene more nearly approximating Hevea.

*Example 5*

Two reaction vessels were charged with isoprene and 0.22 part by weight of lithium sand. Polymerization of the ingredients of one of reaction vessels (Sample 13) was carried out in accordance with the invention by initiating polymerization at 40° C and carrying out the major proportion of the polymerization at 0° C. The ingredients of the other reaction vessel (Sample 14) were polymerized to completion at 40° C. Inherent viscosity, gel content and infra-red microstructure determinations were made on the resulting polymers and were as follows:

|  | Sample 13 | Sample 14 |
| --- | --- | --- |
| Gel, percent | 3.20 | 56.30 |
| Inherent viscosity | 9.75 | 5.22 |
| Cis-1,4, percent | 92.30 | 86.20 |
| Trans-1,4, percent | 1.50 | 5.90 |
| 1,2, percent | 0.00 | 0.30 |
| 3,4, percent | 6.20 | 7.60 |

*Example 6*

As an illustration of the merit of the method of the invention in conjunction with solution technique, two reaction vessels were charged according to the following formula:

|  | Parts by weight |
| --- | --- |
| Isoprene | 100.0 |
| n-Butane | 300.0 |
| Lithium sand | 0.2 |

Polymerization of the ingredients of one of the vessels (Sample 15) was carried out in accordance with the invention by initiating polymerization at 50° C. and then completing the polymerization at 0° C. Polymerization of the ingredients of the other reaction vessel (Sample 16) was initiated and completed at 50° C. Inherent viscosity, percent gel and infra-red structure determinations were made on each of the resulting polymers and were as follows:

|  | Sample 15 | Sample 16 |
|---|---|---|
| Gel, percent | 0.50 | 1.5 |
| Inherent viscosity | 6.85 | 8.16 |
| Cis-1,4, percent | 94.20 | 84.70 |
| Trans-1,4, percent | 0.00 | 8.20 |
| 1,2, percent | 0.00 | 0.00 |
| 3,4, percent | 5.80 | 7.00 |

Referring to the above data, it is seen that both polymers contained essentially no gel; this is typical for solution polymerizations. Although the inherent viscosity of Sample 15, in accordance with the invention, is slightly lower than that of Sample 16, the structure of Sample 15 was substantially better than that of Sample 16.

*Example 7*

Another reaction vessel was charged in vacuo with pure grade isoprene and 0.025 part by weight per 100 parts monomer of lithium sand (Sample 17). Polymerization in accordance with the invention was initiated at 25° C.; the temperature was then reduced to, and maintained at, —10° C. until polymerization was complete. Inherent viscosity, percent gel and infra-red microstructure determinations were made on the resulting polymer and were:

|  | Sample 17 |
|---|---|
| Gel, percent | 0.75 |
| Inherent viscosity | 7.60 |
| Cis-1,4, percent | 92.50 |
| Trans-1,4, percent | 0.00 |
| 1,2, percent | 0.00 |
| 3,4, percent | 7.400 |

*Example 8*

A blend (referred to hereafter as Sample 18) of several individual polymers produced according to substantially the same procedure as the polymer Sample 13 above (the blend having an inherent viscosity of 5.8, a gel content of 3.8 and a structure by infra-red technique of 93.7% cis-1,4-; no trans-1,4-; 0.1% 1,2-; and 6.3% 3,4-addition products) was compounded according to the following tire tread recipe:

|  | Parts by weight |
|---|---|
| Polymer (Sample 17) | 100.00 |
| Zinc oxide | 3.00 |
| Stearic acid | 2.60 |
| Softener | 3.00 |
| Sulfur | 2.60 |
| Accelerator | 0.75 |
| Antioxidant | 1.60 |
| Carbon black | 50.00 |

For comparison purposes Hevea rubber was compounded according to the same tire tread formula. Physical properties of the two compounds were determined and were as follows:

|  | Sample 18 | Hevea |
|---|---|---|
| Cured 60 minutes at 280° F.: |  |  |
| 300% Modulus, p.s.i. | 2,075 | 2,125 |
| Tensile, p.s.i. | 3,475 | 3,825 |
| Elongation, percent | 460 | 480 |
| Cured 45 minutes at 280° F.: |  |  |
| Forced Vibrator at 100° C.— |  |  |
| Dynamic modulus, p.s.i. | 212 | 198 |
| Internal friction, kilopoises | 2.4 | 2.8 |
| Ring Tensile at 212° F.: |  |  |
| Tensile, p.s.i. | 1,750 | 2,125 |
| Elongation, percent | 330 | 480 |
| Firestone Flexometer: |  |  |
| Running temperature, ° F. | 204 | 226 |
| Blowout time, minutes | 45 | 25 |

The above compounds were each built into an 8.00–15 tire of standard construction as the tread thereof. The tires were mounted and run on a test fleet car at high speeds. Assigning an arbitrary par wear value of 100 to the tire having the Hevea rubber tread, the tire having the synthetic polyisoprene rubber tread in accordance with the invention (Sample 18) exhibited after 12,000 miles a wear rating of 95. The Hevea tread after 12,000 miles was badly cracked whereas the synthetic polyisoprene in accordance with the invention exhibited no tread cracking. Resistance of the synthetic polyisoprene rubber to flex-cracking is thus outstanding.

What is claimed is:

1. Method which comprises subjecting in vacuo a mixture consisting essentially of isoprene and metallic lithium to a temperature sufficient to initiate polymerization of said isoprene in the range of about 0° C. to about 30° C. and completing said polymerization at an appreciably reduced temperature but substantially no lower than about —20° C.

2. Method which comprises subjecting a mixture consisting essentially of isoprene and metallic lithium to a temperature sufficient to initiate polymerization of said isoprene in the range of about 30° C. to 70° C. and thereafter appreciably reducing the temperature of said mixture to complete polymerization of said isoprene at a temperature not substantially lower than about —20° C.

References Cited in the file of this patent
UNITED STATES PATENTS

| 1,073,116 | Harries | Sept. 16, 1913 |
| 2,506,857 | Crouch | May 9, 1950 |

FOREIGN PATENTS

| 12,980 | Great Britain | Dec. 11, 1913 |

OTHER REFERENCES

Ziegler: Rubber Chem. and Tech. 11, 501–07 (1938).
Flory: Principles of Polymer Chemistry, Cornell University Press, Ithaca, New York, 1953, page 145 relied on.

UNITED STATES PATENT OFFICE

CERTIFICATE OF CORRECTION

Patent No. 2,979,494　　　　　　　　　　　April 11, 1961

Richard S. Stearns

It is hereby certified that error appears in the above numbered patent requiring correction and that the said Letters Patent should read as corrected below.

Column 1, line 46, for "height" read -- weight --; column 2, line 46, for "microstructure" read -- macrostructure --.

Signed and sealed this 21st day of November 1961.

(SEAL)
Attest:

ERNEST W. SWIDER
Attesting Officer

DAVID L. LADD
Commissioner of Patents

USCOMM-DC